July 31, 1956 N. D. LARKY 2,757,229
AUTOMATIC CHROMA CONTROL CIRCUIT
Filed June 7, 1951
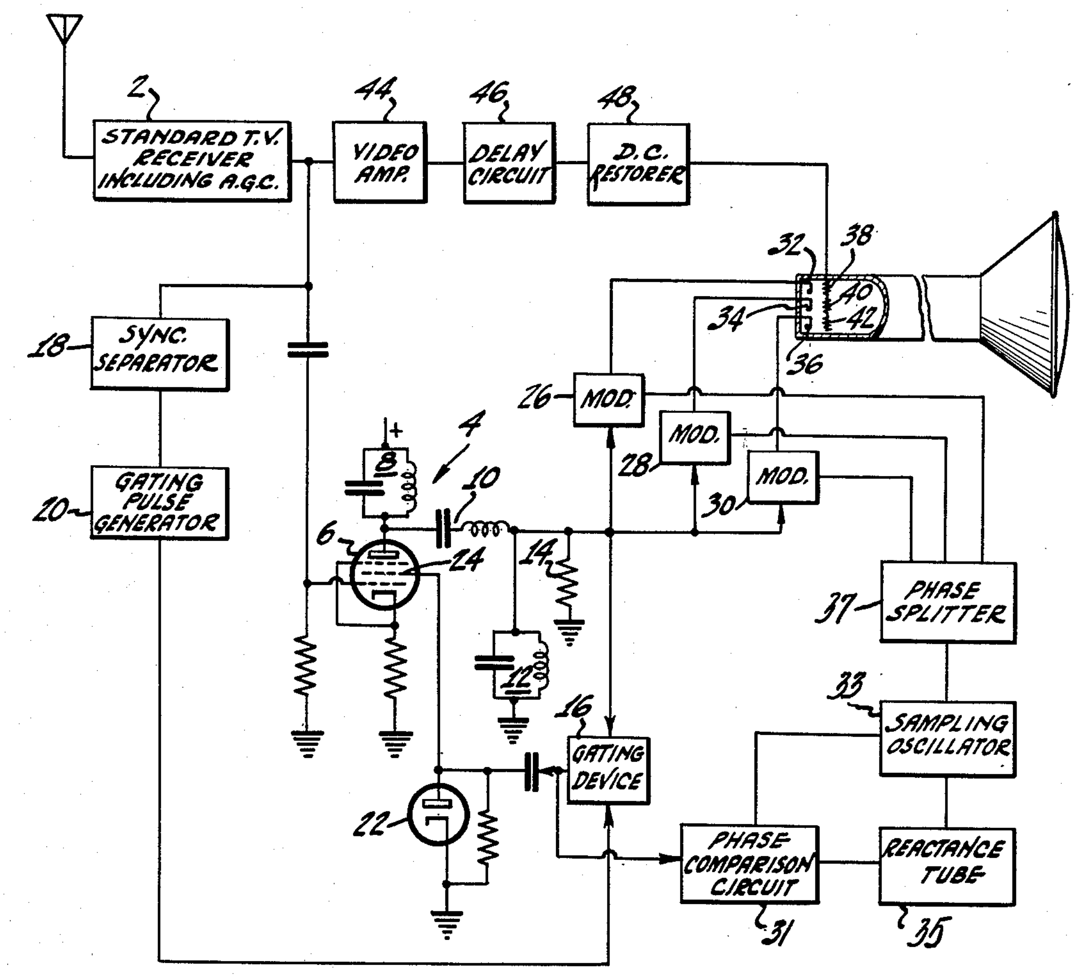
INVENTOR
NORBERT D. LARKY
BY
[signature]
ATTORNEY 2,757,229
Patented July 31, 1956

2,757,229

AUTOMATIC CHROMA CONTROL CIRCUIT

Norbert D. Larky, Somerville, N. J., assignor to Radio Corporation of America, a corporation of Delaware Application June 7, 1951, Serial No. 230,275
1 Claim. (Cl. 178—5.4)

This invention relates to apparatus for controlling the gain of receivers and more particularly to color television receivers.

It is customary to control the gain of a television receiver in accordance with the detected amplitude of the horizontal synchronizing pulses which are low frequency with respect to image signals. However, there are factors, such as variations in reflections from nearby surfaces, antennas swaying in the wind, and even the loss of high frequency power at the transmitter, that can cause the amplitude of high frequency image signals to vary independently of the low frequencies. These independent variations in the amplitude of high frequencies cannot therefore be counteracted by a gain control operating in response to the relatively low frequency sync signals. The low frequencies may, for example, have too high an amplitude while at the same time the amplitude of the high frequencies may remain too low.

In a black and white television system, variations in the amplitudes of the high video frequencies due to fading, for example, cause variations in the resolution of fine details, and hence the sharpness of the television images.

In certain types of color television, much of the color information is carried by the upper end of the video spectrum, and therefore random variation in the amplitudes of these frequencies produces harmful effects. For example, if the brightness information is carried by the low frequencies and the color information by the high frequencies, unwanted relative variations in the amplitudes of the low and high frequencies produce variations in the saturation with which the colors are produced. If, on the other hand, the upper portion of the video spectrum carries information as to the intensity variations of but a single color, the colors reproduced in the image by combining this single color carried by the high frequencies and other colors carried by the low frequencies are in error.

It has previously been proposed that the "Q" of a video amplifier be controlled in accordance with the amplitude of a burst of high frequency alternating current energy transmitted during the back porch interval immediately following the horizontal sync pulse. Where horizontal interlacing is used, either in black and white or in color transmission, such bursts are normally provided so as to synchronize the interlacing at the receiver. Where interlacing is not employed bursts could be added to the signal. However, changing the "Q" alters the shape of the response of the video amplifier, and may affect the response of the low frequencies in an undesirable manner.

It is therefore an object of this invention to provide an improved means whereby the gain of the receiver in the upper portion of the video spectrum may be independently controlled.

It is another object of the invention to provide an improved means for maintaining the ratio of the amplitudes of high and low frequencies constant for a given input.

Still another object of the invention is to independently control the amplitude of the high frequency response of a receiver without changing the shape of its high frequency response.

According to the present invention, these objectives may be attained by passing the higher frequencies through a separate video channel and controlling the gain of the channel in accord with the amplitude of the burst. If the overall gain of the receiver is maintained constant for low frequencies by known circuits, any variations in the amplitude of the high frequency burst must be caused by factors noted above that primarily affect high frequencies. These effects are counteracted by the present invention so that the original relative amplitudes of the low and high frequencies can be maintained.

Other and incidental objects will become apparent upon a reading of the following description and an inspection of the accompanying drawing which shows by block and circuit diagram one form of this invention.

The invention will now be described in connection with a color television system in which the color information is carried by a subcarrier and associated side bands located at the upper end of the video spectrum. This subcarrier may be derived by modulating each of a plurality of differently phased waves of subcarrier frequency with different color information and adding the products of modulation. Thus the phase and amplitude of the resultant subcarrier varies with the color being televised at any instant. Because of the eye's low acuity for detail in color, the color information applied to the modulators may be limited to the low frequencies. After modulation, however, this color information is represented by the sidebands of the subcarrier and therefore lies in the upper portion of the video spectrum.

At the receiver, the color signals lying in the upper portion of the video spectrum are modulated with waves of subcarrier frequency having the same phase as the waves of subcarrier frequency that were modulated at the transmitter. The brightness information is transmitted in a separate channel and combined with the color signals that were recovered by the modulation.

In such a system, a burst of alternating current energy of subcarrier frequency is transmitted on the back porch so that the phase of the modulating waves at the receiver may be synchronized with the waves of subcarrier frequency that were modulated at the transmitter.

If proper synchronization and proper color reproduction are to be achieved in such a system, the overall gain for high frequencies, including the burst frequency, must be maintained constant. The output of a receiving means 2 is supplied via a variable gain amplifier 6 to a band pass filter 4 that is adapted to pass whatever frequencies contain the color information. A parallel resonant circuit 8 is connected between the plate of amplifier 6 and a source of fixed potential. The plate of the amplifier 6 is coupled by a series resonant circuit 10 to the ungrounded end of another parallel resonant circuit 12 and to the ungrounded end of a filter terminating resistor 14. These resonant circuits 8, 10, and 12 are tuned to the band of frequency in which the color information resides, and together comprise the band-pass filter 4.

The output of the band pass filter 4 is applied to a gating device 16. Inasmuch as the burst for color synchonizing lies within the pass band of the band pass filter 4, the burst is applied to the gating device 16. However, because it occurs only during the back porch interval that immediately follows the horizontal sync pulse it may be separated out from the rest of the color information if the gating device 16 is rendered operative to pass signals only during the back porch interval. This may be effected by employing a standard sync separator 18 to separate out the sync signals from the video signals and applying these sync signals to a gating pulse generator 20, which may take the form of a monostable multivibrator. The gating pulse generator 20 may be triggered by either the leading or trailing edge of the horizontal sync pulses so as to produce a pulse within the back porch interval occurring at the same time as the burst of color sync. Thus the color sync signals alone appear at the output of the gating device 16 and are rectified by rectifying means 22. The output of the rectifier 22 is applied to a grid 24 of the amplifier 6 in the band pass filter 4 in such manner as to vary its gain inversely to the amplitude of the burst. Accordingly, the gain of the receiver for the band of frequency containing the color information is maintained at a constant.

In this particular color television system, the band of frequencies containing the color information is applied to each of the plurality of modulators 26, 28, and 30. The bursts of color sync information appearing at the output of the gating device 16 are applied to a phase comparison circuit 31 wherein their phase is compared with the phase of a color sampling oscillator 33. The phase of the color sampling oscillator 33 is controlled by a reactance tube 35 in response to the output of the phase comparison circuit 31 in such manner that the sampling oscillator 33 has the same phase and frequency as the burst of color sync information. The output of the sampling oscillator 33 is then separated into a plurality of different phases by a phase splitter 37 and each different phase is applied to a different one of the modulators 26, 28, and 30. Here it is modulated by the signals appearing at the output of the pass-band filter 4.

It is noted above that the color signals are represented in this particular color television system by the phase and amplitude of a subcarrier. The subcarrier was generated by adding together the modulations of differently phased subcarrier waves and therefore, because the phase splitter 37 provides similarly phased subcarrier waves, the modulations applied at the transmitter may be recovered by the modulators 26, 28, and 30. The color signals that are recovered by the action in the modulators 26, 28 and 30 may be applied to cathodes 32, 34, and 36 of three different electron guns. The output of the receiving means 2 is applied to the corresponding grids 38, 40, and 42 of these electron guns via a video amplifier 44, a delay circuit 46, and a DC restorer 48. The delay circuit 46 makes up for the delay in the color channels introduced by the band pass filter 4 and modulators 26, 28, and 30 so that the complete video signals arrive at the grids 38, 40 and 42 in proper relationship with the color signals applied to the cathodes 32, 34, and 36.

The invention has been described in connection with a particular type of color television system. However, it should be understood that it can be applied to any signal transmission system wherein the ratio of the gains for low and high frequencies is important.

What is claimed is:

In a color television receiver for receiving a television radio carrier wave modulated by a composite color television signal having a periodically recurrent line synchronizing pulse component, a color burst component comprising individual periodic bursts of a fixed signal frequency, and of a periodicity equal to that of said line synchronizing pulse component, a brightness component, and a chrominance component: a carrier signal demodulation circuit operatively connected in said receiver for demodulating received television radio carrier waves to deliver demodulated color television signals having the components above described; a line synchronizing pulse separator circuit operatively coupled with said demodulation circuit for delivering synchronizing pulses; periodic wave generating means capable of pulse synchronization and productive of a control pulse substantially of the same duration as the individual periodic bursts comprising said burst component; means operatively coupling said line synchronizing pulse separator circuit with said wave generating means for synchronizing said generating means with line synchronizing pulses; a normally closed signal gate circuit operatively coupled with said generating means for opening in response to said control pulse, said gate circuit including a signal input terminal means and a signal output terminal means; a chrominance amplifier having an input circuit terminal means operatively coupled with the output of said demodulation circuit, said chrominance amplifier also having an output circuit terminal means; means operatively coupling said chrominance amplifier output circuit terminal means to the input terminal means of said gate circuit such that during said control pulse periods separated bursts appear at said gate circuit output terminal means; a burst rectifier circuit for rectifying separated burst components to produce a chrominance amplifier gain control signal; and means coupled with said chrominance amplifier and said rectifying means altering the gain of said receiver for chrominance signals as a function of the value of said chrominance amplifier gain control signal.

References Cited in the file of this patent

UNITED STATES PATENTS

| | | |
|---|---|---|
| 2,251,929 | Freeman | Aug. 12, 1941 |
| 2,548,829 | Sziklai | Apr. 10, 1951 |
| 2,586,760 | Bedford | Feb. 19, 1952 |